United States Patent [19]

Carnahan

[11] Patent Number: 5,133,875
[45] Date of Patent: Jul. 28, 1992

[54] SYSTEM AND METHOD FOR TREATING WASTEWATER CONTAINING INDUSTRIAL ESTERS

[75] Inventor: Robert P. Carnahan, Temple Terrace, Fla.

[73] Assignee: University of South Florida in behalf of Board of Regents of the State of Florida, Fla.

[21] Appl. No.: 601,928

[22] Filed: Oct. 9, 1990

Related U.S. Application Data

[60] Continuation-in-part of Ser. No. 487,407, Mar. 1, 1990, abandoned, which is a division of Ser. No. 337,264, Apr. 13, 1989, Pat. No. 4,919,814.

[51] Int. Cl.$^5$ .............................................. C02F 1/66
[52] U.S. Cl. ..................................... 210/750; 210/752; 210/188; 210/199; 210/205; 210/218; 210/916; 210/920
[58] Field of Search ............... 210/188, 199, 201, 202, 210/205, 218, 220, 258, 259, 608, 631, 708, 724, 725, 749, 750, 752, 916, 920; 260/412.5, 412.7, 415, 418

[56] References Cited

U.S. PATENT DOCUMENTS

| | | | |
|---|---|---|---|
| 3,738,933 | 6/1973 | Hollo | 210/725 |
| 3,801,499 | 4/1974 | Luck | 210/724 |
| 3,951,795 | 4/1976 | Doncer et al. | 210/201 |
| 4,744,904 | 5/1988 | McAninch et al. | 210/708 |
| 4,790,943 | 12/1988 | Dunn et al. | 210/708 |
| 4,894,162 | 1/1990 | Cournoyer et al. | 210/916 |
| 4,919,814 | 4/1990 | Carnahan et al. | 210/916 |
| 4,940,539 | 7/1990 | Weber | 210/608 |

FOREIGN PATENT DOCUMENTS 61-36390 2/1986 Japan.

*Primary Examiner*—Stanley S. Silverman
*Assistant Examiner*—Christopher Upton
*Attorney, Agent, or Firm*—Allen, Dyer, Doppel, Franjola & Milbrath

[57] ABSTRACT

A system and method for treating wastewater containing industrial esters collected from grease traps at food establishments, septic tanks or from sludge digesters by increasing the pH of the wastewater to break down the ester. The increased pH wastewater is mixed to a predetermined mean velocity gradient which allows the influent to react. The reacted influent is then stabilized to lower the pH to normal levels suitable for input into a municipal wastewater treatment facility. Volatile gases are drawn off from all of the reactor tanks and placed into a treatment tank. In the tank a reduction of the bacterial and odor level occurs when the wastewater reacts with the chlorine-containing water output of the municipal wastewater treatment facility.

15 Claims, 3 Drawing Sheets

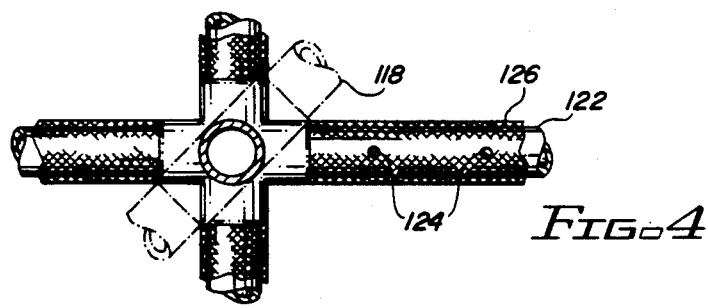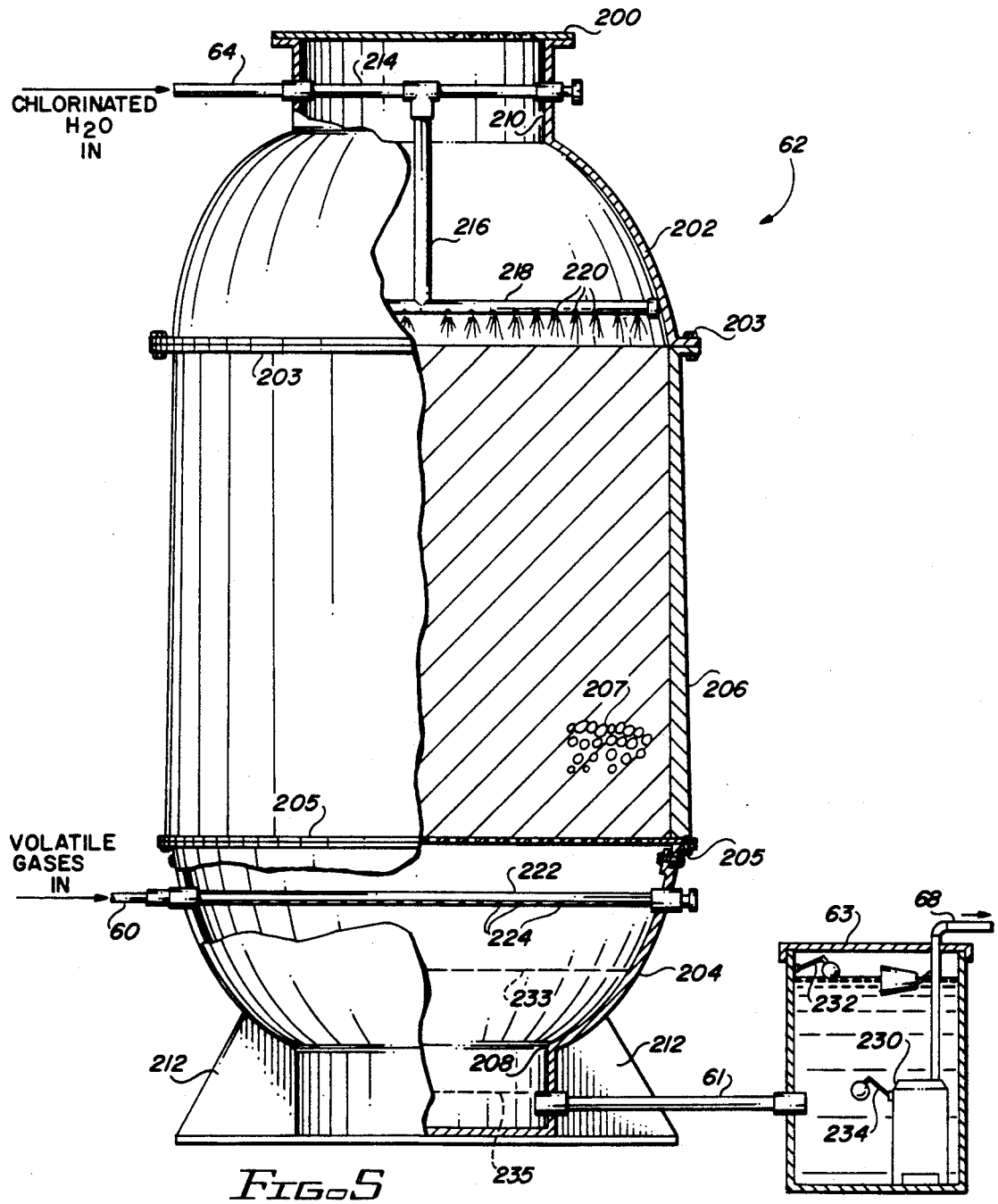

SYSTEM AND METHOD FOR TREATING WASTEWATER CONTAINING INDUSTRIAL ESTERS

This is a continuation-in-part of co-pending application Ser. No. 487,407 filed Mar. 1, 1990, now abandoned, which is a division of application Ser. No. 337,264 filed Apr. 13, 1989, now U.S. Pat. No. 4,919,814.

BACKGROUND OF THE INVENTION

The above referenced U.S. Pat. No. 4,919,814 discloses a system and method for treating wastewater collected from septic tanks and similar installations, and rendering the wastewater conducive to biochemical treatment in a conventional wastewater treatment system. The present invention is directed to modifications of that system and a related method which permit treatment of ester-containing wastewater and transforming that wastewater into a condition so as to be conducive to biochemical treatment in a conventional wastewater treatment system.

Most restaurant and fast food establishments are required to have a grease trap which permits the grease to congeal, and excludes it from entering the sewer system. This congealed grease must be removed from these traps periodically and disposed of by some approved method.

The manner in which the wastewater laden with esters is disposed of varies significantly depending upon local ordinances and restrictions. In many areas, discharge into a conventional municipal wastewater treatment plant is either the required, or at least preferred, method of disposal. However, because ester-laden wastewater is most often in a non-biodegradable condition, the discharge of this concentrated wastewater into a conventional municipal wastewater treatment facility will either deteriorate the efficiency of that facility, or in some cases will even cause failure of the entire treatment system.

SUMMARY OF THE INVENTION

It is the purpose of the present invention to provide a system and method which is preferably located adjacent a conventional municipal wastewater treatment facility, for pre-treating waste-water containing industrial esters collected from food establishments and similar installations, and rendering that ester-laded wastewater in a condition which is suitable for discharge into the head end of the conventional wastewater treatment facility.

It is a further purpose of the present invention to provide a system and method which will achieve the objective noted above, while at the same time treating the volatile gases, particularly hydrogen sulfide, which are prevalent in ester-laded wastewater.

To achieve these purposes, a method for treating wastewater containing industrial esters for rendering the wastewater suitable for input into a conventional wastewater treatment facility is provided, the method comprising the steps of increasing the pH level of the wastewater to saponify the esters and mixing the increased pH level wastewater to a predetermined mean velocity gradient to break down the esters within the wastewater. After the esters are broken down, the pH level of the wastewater is lowered rendering the wastewater suitable for input into the conventional wastewater treatment facility.

In the preferred form, the increased level pH wastewater is treated with a surfactant to dissolve the esters before mixing the wastewater to the mean velocity gradient. Alternately, the volatile gases are drawn off while the wastewater is being mixed and further the gases are placed in a treatment tank. When these gases are drawn off they are treated to reduce their bacterial and odor level.

Additionally, to achieve these purposes, a method of the present invention comprises the steps of placing the wastewater in a reactor tank and feeding the wastewater with oxygen containing fluid while in the reactor tank so as to stimulate the release of volatile gases from the wastewater and thereby render the wastewater in a generally aerobic condition. At the same time, volatile gases are drawn off in the reactor tank and placed into a treatment tank where they are treated to reduce the bacterial and odor level in those gases. The converted aerobic wastewater is then pumped into the head end of a conventional aerobic wastewater treatment facility. In the preferred form the treatment step for volatile gases includes the utilization of the chlorinated water output of the municipal wastewater facility, which is reacted with the volatile gases to reduce hydrogen-sulfide content. The water is then re-injected into the head end of the municipal wastewater facility.

The system in accordance with the present invention comprises means for treating the wastewater to dissolve the esters and rendering the ester dissolved wastewater suitable for input into a conventional wastewater treatment facility, means for drawing volatile gases out of the dissolving means and for treating the volatile gases to reduce the bacterial and odor levels and means for pumping the suitable wastewater into the head end of a conventional wastewater treatment facility. Preferably the system comprises a reactor tank in which the esters are dissolved. Also in the preferred form, the treating means adds a surfactant to dissolve the esters within the wastewater while raising the pH level to break down the esters. Also in the preferred form the rendering means lowers the pH level in the treated wastewater to render the wastewater suitable for input into a conventional wastewater treatment facility. Additionally it is preferred that means for mixing be included to treat the wastewater at a predetermined mean velocity gradient to enhance the dissolution of the esters in the wastewater.

The system in accordance with the present invention comprises a storage tank which also is used to comminute the incoming ester-laden wastewater and further includes, in a preferred form, three reactor tanks which are connected in series to receive the comminuted output from the storage tank and successively bubble the oxygen-containing fluid through the wastewater. Simultaneously, volatile gases and the residual air are drawn out of the top of each reactor tank, and forwarded to a treatment tank where chlorinated water as an output from the conventional wastewater treatment facility trickles downward into reaction with the volatile gases through an inert trickle media, to substantially reduce the hydrogen sulfide gas content of those gases. The liquid output of the treatment tank may then be injected back into the head end of the municipal treatment facility together with the output of the reactor tanks.

DESCRIPTION OF THE FIGURES

FIG. is a schematic illustration of the system of the present invention, as shown co-located with a conventional wastewater treatment facility.

FIGS. 3 and 4 show details of the reactor tank construction of FIG. 2.

FIG. 5 is an elevation, partially in cross section, of the construction of a treatment tank and sump which forms a part of the system of FIG. 1.

DESCRIPTION OF THE PREFERRED EMBODIMENTS

A preferred form of the system of the present invention will now be described with reference to FIG. 1.

Figure 1:
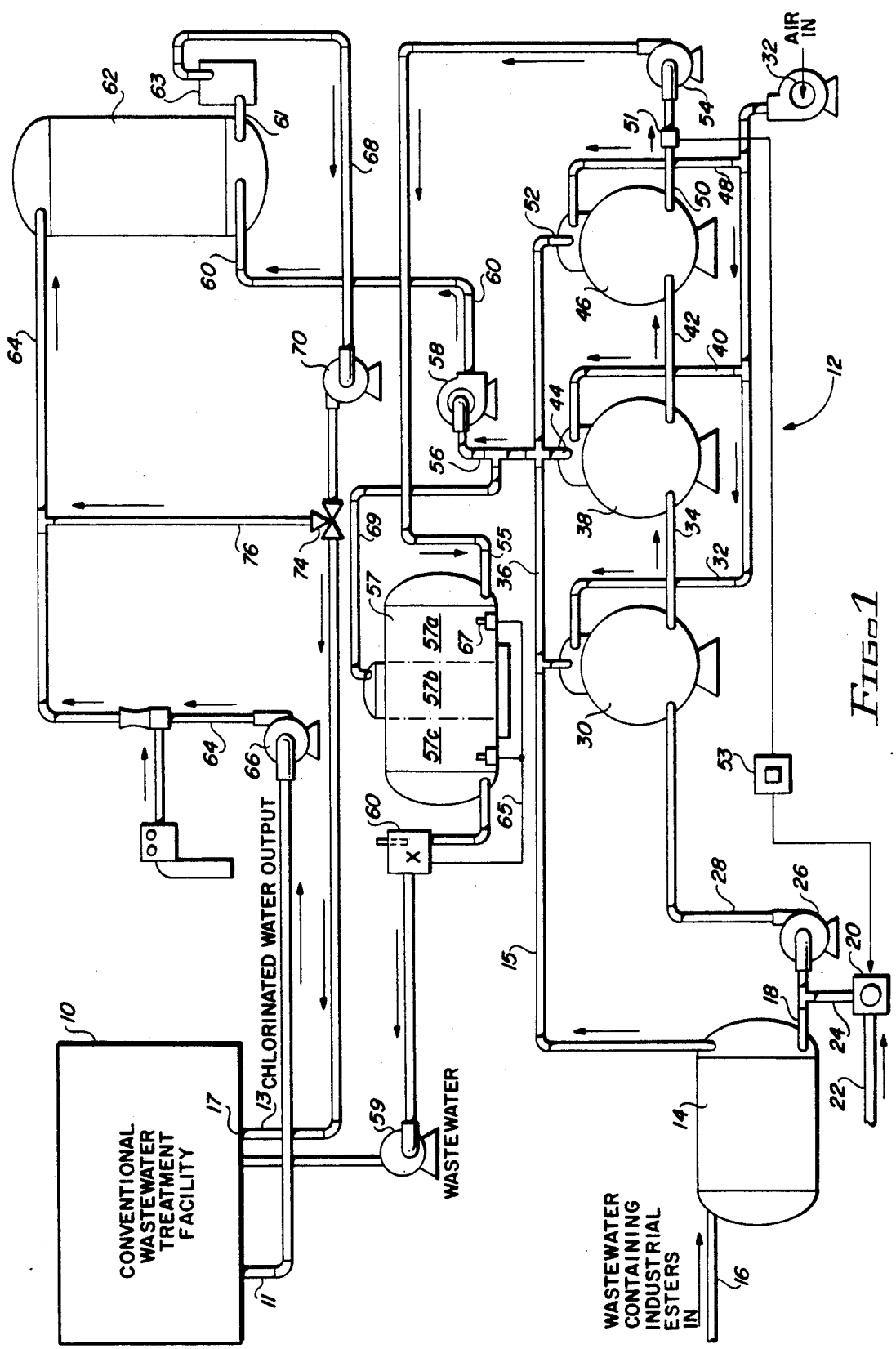

In FIG. 1, a conventional wastewater treatment facility is referred to by the reference numeral 10 and includes input headwater lines 13 and a chlorinated water output 11. It will be appreciated by those skilled in the art that a principal purpose of the present invention is to avoid inputs of large quantities of wastewater containing esters, such as grease or oil, into a municipal wastewater treatment facility.

In accordance with the present invention, a system, generally referred to by the reference numeral 12, is co-located with the wastewater treatment facility 10 in order to pre-treat the ester-laden wastewater obtained from food establishments and similar installations. The system includes storage tank 14 having an input line 16 for receiving ester-laden wastewater from septic tanks, sludge digesters and similar sources. The storage tank 14 is provided with conventional means for grinding and comminuting the raw ester-laden wastewater input, and has an associated discharge pump 26 connected via an output line 18. The storage tank 14 thus reduces the size of the solids pumped to the reactor tanks 30, 38 and 46. Because of this mixing of the ester-laden wastewater in the storage tank 14, some volatile gases are generated within the storage tank 14 and therefore must be exhausted via exhaust line 15 to the volatile gas treatment tank 62, as is described in greater detail below.

The discharge of storage tank 14 is injected with a chemical substance from chemical mixer 20 that is fed to output line 18 via line 24. Chemicals are fed to mixer 20 via line 22. The chemical substance added is preferably a mixture of water and peroxide (OH—) to promote a base hydrolysis with the wastewater from storage tank 14 to break down the ester. Preferable hydroxide include sodium hydroxide and potassium hydroxide. The proportions of the water to provide mixture is controlled by mixer 20. The reaction of the chemical substance being added is shown by the following:

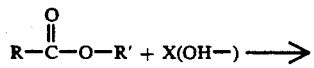

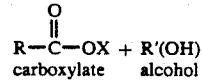
carboxylate   alcohol

A polymer similar to the structure of alkylphenoxyethanol, shown by

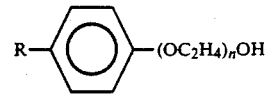

is also controlled with mixer 20 and injected into line 24. This polymer may include any chelating agent or surfactant that maintains in solution the inorganic and organic constituents of the wastewater so that the organic and inorganic species can be effectively treated. Examples of the surfactants include Triton X-100 & 45 manufactured by Rohn Haas Co. of Philadelphia, Pa., or any chemical that has the characteristics of a hydrophobic or hydrophilic functional group. It is further preferable that these surfactants prevent the precipitation of any compound from occurring within the discharge of storage tank 14. It is recognized that the raising of the pH level of the wastewater breaks down the esters by hydrolysis and the adding of a surfactant to the wastewater dissolves the broken down esters.

Aeration of the wastewater occurs in plural enclosed reactor tanks 30, 38 and 46, each of which has an input air sparger 32, 40 and 48, respectively. As will be described in greater detail below, the reactor tanks 30, 38 and 46 are generally spherical in shape and range in size from about 500 to 2,000 gallons in capacity. Each reactor tank 30, 38 and 46 typically receives air at a rate of about 50 cubic feet per minute, which preferably represents an air volumetric flow rate in cubic feet per minute on the order of about one tenth of the liquid volume of the respective reactor tank. Preferably, about forty percent of the volume of each reactor tank 30, 38 and 46 is provided as free space above the fluid level of the wastewater to be treated, in order to initiate oxygenation of the volatile gases generated in that free space. The hydraulic retention in each tank 30, 38 and 46 will range between 12 and 30 minutes per tank, for a total of about thirty-six to ninety minutes. Retention time may be varied, depending upon the required level of treatment; however, it is preferred to obtain a minimum dissolved oxygen concentration on the order of at least about 2.0 milligrams per liter in the wastewater being treated, prior to discharge into the head end 17 of the wastewater treatment facility 10.

Figure 2:
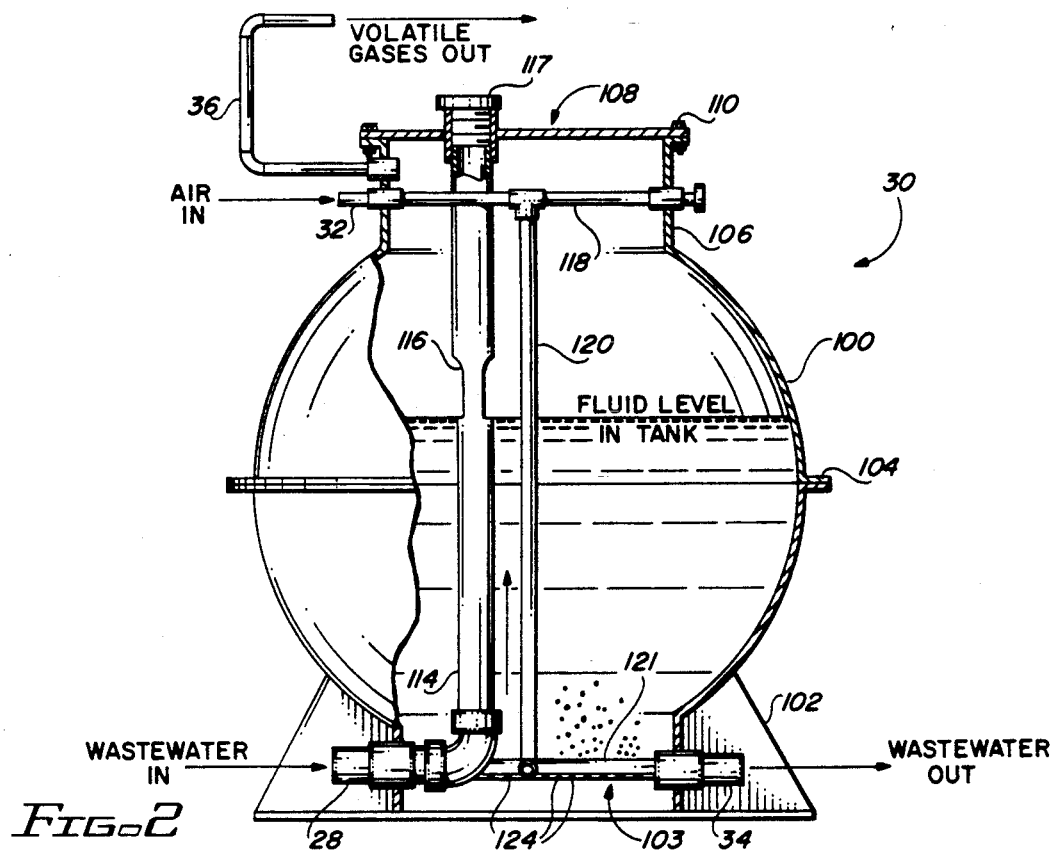
FIG. 2 is an elevation, partially in cross section, of one of the reactor tanks shown in the system of FIG. 1.
Figure 3:
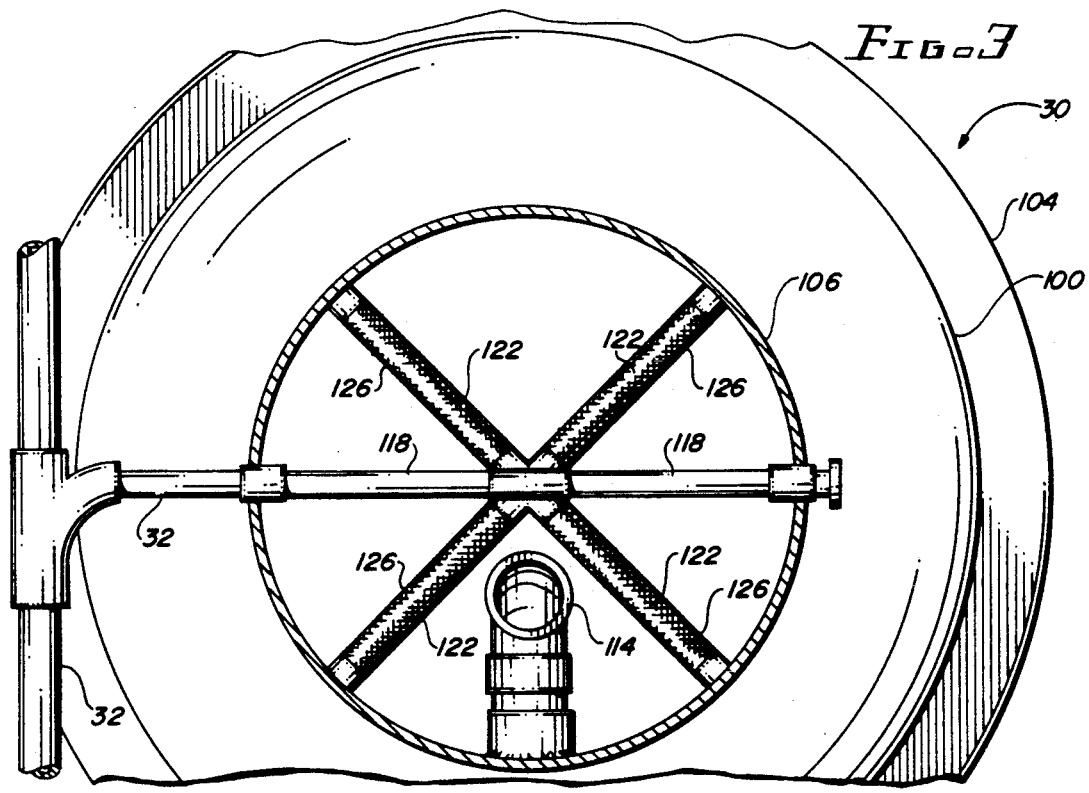

To achieve this objective, each reactor tank is provided with a construction like that shown in FIGS. 2, 3 and 4. Noting FIG. 2, the reactor tank 30 is formed of a spherical tank 100 having a lower cylindrical extension 103 and an upper cylindrical extension 106. The spherical tank 100 is formed of two halves, which are joined together by a flange 104. A cover 108 is provided, and is secured by bolts 110. Supports 102 are provided at the bottom of the tank.

The input line 28 receives the comminuted wastewater from the storage tank 14, and passes upwardly into the reactor tank 30 and out of openings 116. The openings 116 thus control the fluid level in the tank 30. A cap member 117 permits access to the vertical standpipe 114 for cleaning purposes. The air sparger 32 passes air through the upper cylindrical extension 106 and feeds air into a horizontal tube 118, a vertical tube 120, and thence into four air dispersion arms 122 located in the lower cylindrical extension 103 (note FIG. 2 and 3). Each air dispersion arm 122 has a plurality of openings 124 extending downward, and through which the air is bubbled upwardly through the wastewater located in the reactor tank 30, for purposes of oxygenating that wastewater and producing a mean velocity gradient (G) of 300 sec$^{-1}$ to mix the wastewater in reactor tanks 30, 38 and 46. In order to reduce the size of the bubbles emitted from the openings 124 and protect the openings from intrusion of solids contained in the wastewater, a dispersion fabric 126 is fitted across each air dispersion arm 122 (note FIGS. 3 and 4).

It should be noted that this system has the capability of increasing the oxygen concentration within reactor tank 30 by 15% through the use of gas membranes on the supply side of input air sparger 32. This provides for the potential use of this invention as the wet oxidation of highly concentrated wastes to include hazardous organic materials. This system can further be upgraded to treat specific industrial waste by feeding peroxide or ozone into each reactor through mixer 121. The reactions for peroxide and ozone are well-known in the art, and are not described here.

Referring again to FIG. 1, reactor tank 30 is coupled to a treated wastewater output line 34, which in turn is coupled to an internal standpipe in reactor tank 38 which is essentially identical to the standpipe 114 shown in FIG. 2. Similarly, a reactor tank 38 is connected to a treated wastewater output 42, which is in turn coupled to an internal vertical standpipe in reactor tank 46 which is essentially identical to the standpipe 114 of FIG. 2. The output 50 of the last reactor tank (in this case, reactor tank 46) is transmitted via pH level detector 51 and pump 54 to the head end 55 of stabilization tank 57.

The pH level detector 5 1 senses the alkaline/acid level of output 50 and then sends a signal to chemical mix controller 53 in accordance with the level detected. If too high of a pH level is detected, controller 53 feeds a signal to mixer 20 to increase the water concentration being injected on line 18. If the pH level is too low, controller 53 feeds a signal to mixer 20 to inject a higher concentration of peroxide (OH—) into line 18.

The stabilization tank 57 is a 5,000 gallon vessel which contains three compartments, 57(a–c) to provide addition aeration and retention. These tanks may be purchased from Plastic Piping Systems of Piscataway, N.J. or Advanced Structures, Inc. of San Marcos, Calif. The first compartment is injected with a concentrated acid such as hydrochloric acid, to reduce the pH of the treated wastewater to a pH level below 8. In the second compartment 57b, a carbonate, such as soda ash, is added to buffer the wastewater. The carbonate species in the wastewater will be in the bicarbonate form and will not represent a potential sludge. Aeration will be used to agitate the tank and ensure a mean velocity gradient of 300/sec. The wastewater is fed to a third compartment 57c to provide further agitation and increase the carbonated wastewater retention time. The output of the stabilization tank 57 is transmitted via a second pH level detect 60 and pump 59 to the head end of the municipal wastewater treatment facility 10.

The second pH level detect 60 senses the level of the pH being transmitted from tank 57. The second pH level detect 60 feeds a signal into line 65 to a feeder 67 that regulates the quantity of acid being fed into compartment 57a, in accordance with the level detected. For example, when the pH level is high, feeder 67 increases the amount of acid being fed into compartment 57a, and when the level is too low, feeder 67 reduces the amount of acid being fed to compartment 57a. The pH level of the treated wastewater is lowered to a level that ensures that the output of stabilization tank 57 will be a biodegradable fluid.

Simultaneously with the treatment of the solids and liquids of the wastewater, the volatile gases are drawn out of the storage tank 14, each reactor tank 30, 38, and 46 and out stabilization tank 57 via respective lines 15, 36, 44, 52 and 69 into a common line 56 and thence through a pump 58 into a treatment tank 62. Treatment tank 62 is also fed chlorinated water which is drawn out of wastewater treatment facility 10 into water line 11 and then through pump 66, line 64 and into treatment tank 62. The specific construction of the treatment tank and an associated sump 63 is shown in FIG. 5 and described next.

The treatment tank 62 may be formed of hemispheres 202 and 204 which are connected by an intermediate cylindrical section 206 by corresponding flanges 203 and 205. A lower cylindrical extension 208 extends from the lower sphere, and the upper hemisphere 202 is connected to an upper cylindrical extension 210. A cover 200 is provided at the top of the tank, and supports 212 are provided at the tank bottom. Located within the cylindrical section 206 is a plurality of inert elements, such as snowflake packing or raschig rings having a diameter on the order of 1.0–3.0 inches and a surface area to volume ratio of 29–58 ft$^2$/ft$^3$. The treatment tank 62 includes an input water line 214 coupled to the chlorinated water line 64, a vertical extension 216 and horizontal dispersion arm 218 through which holes 220 are provided to disperse the chlorinated water downward through the trickle media 207.

The volatile gases drawn off of the reactor tanks 30, 38 and 46 are input through the lower hemisphere 204 via a horizontal line 222 and openings 224. As the gas passes upwardly through the trickle media 207, that gas reacts with the chlorinated water trickling down from the top of the treatment tank 62. The oxygen content of the water reacts with the hydrogen sulfide gas and reduces the odor and bacteria level of the volatile gases.

The resulting water passes out of the treatment tank 62 via an output line 61 to a sump 63, which is used to control the fluid level in the treatment tank 62. More specifically, the sump 63 is provided with a float valve 232 which is used to insure that the maximum water levels remain at about the dotted line 233 as shown in FIG. 5. Similarly, sump 230 is provided with a lower float valve 234 which is used to maintain the minimum water level corresponding to the dotted line 235 in FIG. 5.

Referring once again to FIG. 1, the treated output along line 68 from the sump 63 passes through a pump 70, and thence into the head end 17 of the municipal wastewater treatment facility. Alternatively, as is shown by valve 74, the water may be passed along line 76 back into the top of the treatment tank 62.

It is known that the total volatile acid concentration that can be expected to occur in various esters. The concentration values are specified in Wertheim and Jeskey, *Introductory Organic Chemistry*, McGraw-Hill Book Co., 1956, pp.162–165, which is hereby incorporated by reference. During hydrolysis in the reaction tanks, the esters are hydrolyzed to a product that can be biodegraded within a wastewater treatment plant.

It is noted that the hydrolysis reaction occurs at a pH of 10 or higher resulting in the hydroxide -ion (OH—) being the dominate species.

The kinetics of the reactions are influenced by other materials that are present in the wastewater. However, experience with nitrated esters indicate that the rate constant is equivalent to $1.26 \times 10^{-1} M^{-1} sec^{-1}$ for a second order response. Therefore, the hydraulic retention time of three hours is adequate. The total organic concentration will strongly influence the hydrolysis rate. No biological reactions may be expected in this method of treatment due to the high pH of the solution.

It will thus be understood that the present invention provides a system and method for the treatment of wastewater containing esters collected from grease traps and similar installations, so as to render that wastewater treatable in a conventional aerobic municipal wastewater treatment facility. Simultaneously, the present invention also provides a means for treating the volatile gases generated in the treatment process and oxidizing those gases.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method for treating wastewater containing industrial esters and inorganic materials for rendering the wastewater conducive to biochemical treatment in a wastewater treatment facility, the method comprising the steps of:
    increasing the pH level of the wastewater to saponify the esters and adding a surfactant of chelating agent which dissolves the esters and prevents precipitation of the inorganic materials;
    mixing the increased pH level wastewater to a predetermined mean velocity gradient to cause a reaction that breaks down the esters within the wastewater; and
    lowering the pH level of the reacted wastewater with an acidic solution that completely dissolves into the reacted wastewater and has an anion that prevents precipitation in the reacted wastewater when added to render the wastewater at a level that the broken down esters can be biodegraded within a wastewater treatment facility.

2. The method as recited in claim 1 further comprising the steps of:
    drawing off volatile gases when the wastewater is being mixed; placing the gases in a treatment tank; and
    reacting in the treatment tank the volatile gases with a solution containing an oxidant that break down the organic material in the gas to reduce the bacterial and odor level.

3. A system for treating wastewater for rendering the wastewater conducive to biochemical treatment in a wastewater treatment facility, the system comprising:
    a source of wastewater containing industrial esters and inorganic materials;
    a source of alkaline substance for raising the pH level of said wastewater;
    a source of surfactant or chelating agent which dissolves said esters and prevents precipitation of said inorganic materials in said wastewater;
    means for drawing volatile gases out of said dissolving means and for treating the volatile gases with the solution containing oxidant to reduce the bacteria and odor levels; and
    means for pumping the wastewater out of said dissolving means and into the head end of a wastewater treatment facility.

4. The system as recited in claim 3 further comprising a source of an anion, and for adding said anion to the treated wastewater for lowering the pH level in the treated wastewater to render the wastewater conducive to biochemical treatment in a wastewater treatment facility.

5. The system as recited in claim 3 further comprising means for mixing the treated wastewater at a predetermined mean velocity gradient to enhance the dissolution of the esters in the wastewater.

6. A system for treating wastewater containing industrial esters for rendering the wastewater conducive to biochemical treatment in a wastewater treatment facility, a system comprising:
    a reactor tank;
    a source of wastewater containing industrial esters and inorganic materials;
    means for pumping the wastewater containing industrial esters into the reactor tank;
    a source of a first substance comprising a surfactant or chelating agent and an alkaline material that breaks down esters in wastewater without precipitation of the broken down esters and inorganic materials;
    means for treating the wastewater in the reactor tank with the first substance that breaks down the esters within the wastewater without precipitating the broken down esters;
    a stabilization tank;
    means for pumping the treated wastewater into the stabilization tank;
    a source of a second acidic substance that renders wastewater conducive for treatment in the wastewater into the treatment facility;
    means for treating the wastewater in said stabilization tank with the second substance that renders the wastewater conducive to biochemical treatment in a wastewater treatment facility; and
    means for pumping the conducive wastewater into the head end of a conventional wastewater treatment facility.

7. The system as recited in claim 6 wherein said first substance includes a alkylphenoxyethanol surfactant and an alkaline material which contains a cation.

8. The system as recited in claim 6 further comprising means for mixing the wastewater in the reactor tank to a mean velocity gradient of about 300/sec to enhance esters dissolving within the wastewater.

9. The system as recited in claim 6 wherein said second substance is selected from the group consisting of carbonate and hydrochloric acid.

10. The system as recited in claim 6 wherein said first substance raises the pH level of the wastewater within the reactor tank; and wherein the second substance lowers the pH level of the wastewater within the stabilization tank.

11. A system for treating wastewater containing industrial esters for rendering the wastewater conducive to biochemical treatment in wastewater treatment facility, the system comprising;
    a reactor tank;
    a source of wastewater containing industrial esters and inorganic materials;
    means for pumping the wastewater containing industrial esters into the reactor tank;

a source of an alkaline substance;

means for treating the wastewater with the alkaline substance to increase the pH level of the wastewater to break down the ester;

a source of a surfactant that dissolves broken-down esters and prevents inorganic material from precipitating;

means for treating the wastewater with a surfactant in the reactor tank to dissolve the broken-down ester and to prevent the inorganic material in the wastewater from precipitating;

means for mixing the wastewater in the reactor tank to a predetermined mean velocity gradient to enhance the break down of the esters in the wastewaters;

a stabilization tank;

means for pumping the increased pH level wastewater into said stabilization tank;

a source of an acidic substance that lowers the pH level of wastewater without precipitating;

means for treating the wastewater in the stabilization tank with the acidic substance that lowers the pH level of the wastewater without precipitation to levels that the broken-down esters can be biodegraded in the wastewater treatment facility; and means for pumping the lowered pH wastewater into the head end of a wastewater treatment facility.

12. The system as recited in claim 11 wherein the surfactant is selected from the group consisting of alkylphenoxyethanol or chelating agents.

13. The system as recited in claim 11 wherein said mixing means mixes the wastewater in the reactor tank with an oxygenated gas to a mean velocity gradient of about 300/sec.

14. The system as recited in claim 11 further comprising:

means for drawing off volatile gases when the wastewater is mixed and for placing the drawn off gases in a treatment tank;

a source of a solution containing an oxidant that breaks down organic material in the gas; and means for reacting the volatile gases with the solution containing the oxidant in the treatment tank to reduce the bacteria and odor levels.

15. The system as recited in claim 11 wherein the acidic substance includes an acid for lowering the pH, and soda ash for stabilizing the acid treated wastewater.

* * * * *